US 9,292,268 B2

(12) United States Patent
Meirowitz et al.

(10) Patent No.: US 9,292,268 B2
(45) Date of Patent: *Mar. 22, 2016

(54) SYSTEMS AND METHODS FOR UNIQUELY DEFINING FORTRAN RUN TIME TYPE DESCRIPTORS FOR POLYMORPHIC ENTITIES

(71) Applicant: ORACLE INTERNATIONAL CORPORATION, Redwood City, CA (US)

(72) Inventors: Diane R. Meirowitz, Charlotte, NC (US); Iain George Bason, Winchester, MA (US)

(73) Assignee: Oracle International Corporation, Redwood City, CA (US)

( * ) Notice: Subject to any disclaimer, the term of this patent is extended or adjusted under 35 U.S.C. 154(b) by 264 days.

This patent is subject to a terminal disclaimer.

(21) Appl. No.: 14/181,812

(22) Filed: Feb. 17, 2014

(65) Prior Publication Data

US 2014/0165048 A1     Jun. 12, 2014

Related U.S. Application Data

(63) Continuation of application No. 13/245,060, filed on Sep. 26, 2011, now Pat. No. 8,656,379.

(51) Int. Cl.
*G06F 9/45*          (2006.01)
*G06F 9/44*          (2006.01)
(Continued)

(52) U.S. Cl.
CPC .............. *G06F 8/4434* (2013.01); *G06F 8/315* (2013.01); *G06F 8/41* (2013.01); *G06F 8/437* (2013.01); *G06F 8/443* (2013.01); *G06F 9/443* (2013.01);
(Continued)

(58) Field of Classification Search
None
See application file for complete search history.

(56) References Cited

U.S. PATENT DOCUMENTS 6,728,953 B1 *   4/2004   Walster ................... G06F 8/443
                                                                     717/140
7,080,370 B1 *   7/2006   Crowl ....................... G06F 8/54
                                                                     717/163

(Continued)

OTHER PUBLICATIONS

Reid, John, "The New Features of Fortran 2003," ISO/IEC JTC1/SC22/WG5 N1648, vol. 26 Issue 1, Apr. 2007, Newsletter, ACM SIGPLAN Fortran Forum.

(Continued)

*Primary Examiner* — Lewis A Bullock, Jr.
*Assistant Examiner* — Mark Gooray
(74) *Attorney, Agent, or Firm* — Marsh Fischmann & Breyfogle LLP; Jonathon A. Szumny

(57) ABSTRACT

Systems and methods disclosed herein uniquely define each type of Fortran type descriptor within an executable file or shared library to allow for a rapid determination of how the dynamic type of one object (e.g., a first polymorphic entity) relates to that of another object (e.g., a second polymorphic entity) while allowing for the lazy loading of shared libraries. In one aspect, type descriptor definitions are instantiated (e.g., during compile-time) in each of a number of object files in which polymorphic entities are defined, each type descriptor definition is marked with a singleton attribute, and each group of common type descriptor definitions is associated with a COMDAT group to ensure that only a single copy of each type descriptor is defined in a corresponding executable file at a particular address in memory to which polymorphic entities can reference. Type descriptor addresses can be compared to determine dynamic type relations between two or more polymorphic entities.

16 Claims, 5 Drawing Sheets

(51) Int. Cl.
*G06F 9/455* (2006.01)
*G06F 9/445* (2006.01)

(52) U.S. Cl.
CPC ........ *G06F 9/44521* (2013.01); *G06F 9/45516* (2013.01)

(56) References Cited

U.S. PATENT DOCUMENTS 7,533,376 B2 * 5/2009 Anwar ................ G06F 9/44521
717/146

2002/0152457 A1 * 10/2002 Jahnke .................... G06F 8/315
717/139
2004/0068719 A1 4/2004 Liu et al.
2008/0235675 A1 * 9/2008 Chen ....................... G06F 8/437
717/147

OTHER PUBLICATIONS

Tallam, Sriraman, et al., "Safe ICF: Pointer Safe and Unwinding aware Identical Code Folding in the Gold Linker", 2010, Proceedings of the 2010 GCC Summit, 107-114.

* cited by examiner

SYSTEMS AND METHODS FOR UNIQUELY DEFINING FORTRAN RUN TIME TYPE DESCRIPTORS FOR POLYMORPHIC ENTITIES

CROSS-REFERENCE TO RELATED APPLICATIONS

This application is a continuation of U.S. patent application Ser. No. 13/245,060, filed on Sep. 26, 2011, and now U.S. Pat. No. 8,656,379, which is hereby incorporated by reference.

BACKGROUND

1. Field of the Invention

The present invention generally relates to Fortran type descriptors that can be used to describe dynamic types of objects such as polymorphic entities during runtime of an executable file, and more particularly, to systems and methods that uniquely define each type descriptor within an executable file or shared library to allow for the determination of how the dynamic type of one object relates to that of another by comparing type descriptor addresses of the objects while allowing for the lazy loading of shared libraries.

2. Relevant Background

The 2003 standard of Fortran ("Fortran 2003") introduced the use of polymorphic entities for use in scientific and technical programming. Generally, a polymorphic entity is a data entity that can assume differing types during program execution or runtime. The type of a data entity at a particular point during execution of a program is its "dynamic type." In practice, a polymorphic entity is declared to be of a certain type by using the CLASS keyword in place of the TYPE keyword, and it is then able to take any of a number of types during execution. Representative polymorphic entities include allocatable variables (in which case its dynamic type is whatever it is allocated to be), pointers (in which case its dynamic type is that of its target), and dummy arguments (in which case its dynamic type is that of the actual argument). Polymorphic entities allow code to be written for objects of a given type and used later for objects of an extended type. An entity is said to be type compatible with entities of the same declared type or of any declared type that is an extension of its declared type.

Fortran 2003 also introduced a number of new operations (e.g., functions) that can be performed on polymorphic entities at runtime. For instance, "SAME_TYPE_AS(A,B)" returns "TRUE" if objects A and B have the same dynamic type, "EXTENDS_TYPE_OF(A,MOLD)" returns "TRUE" if the dynamic type of object A is an extension type of the dynamic type of object MOLD, and the "SELECT TYPE" operation selects for execution at most one of its constituent blocks depending on the dynamic type of a variable or expression. Programmers can design executables to take different actions or perform different functions at runtime based on results of one or more of these operations.

In any case, the Fortran compiler generates code (e.g., object files) to keep track of the dynamic type of each polymorphic entity at run time. The dynamic type of each of these variables is represented by a data structure called a "type descriptor" which describes the name of the dynamic type, the context of the dynamic type, the ancestor types of the dynamic type, and the like. Often, a shared object (i.e., shared library) is generated including a list of type descriptors or type descriptor definitions to which the polymorphic entities of one or more object files or subsequently generated dynamic executables can point or reference (e.g., via identifiers, pointers, etc.). The new operations discussed above utilize the type descriptors in varying manners depending upon the particular operation.

For instance, one manner (the "string-compare" method) compares one or more strings of the type descriptors (e.g., type name) and/or contexts (e.g., name of module in which type descriptor resides in shared library) of two polymorphic entities to determine if the polymorphic entities have the same dynamic type. Another manner (the "hash-value compare" method) computes hash values from the type names in the type descriptors of two polymorphic entities (e.g., using any appropriate hash function with each type name as a key). For instance, polymorphic entities may be declared to have the same dynamic type upon the matching of hash values and different dynamic types upon the non-matching of hash values. A further manner (the "unique type descriptor" method) determines and compares the addresses of the type descriptors in memory to determine whether the dynamic types are the same.

SUMMARY

The above-discussed manners of comparing the dynamic types of polymorphic entities of an executable file at runtime are deficient in a number of regards. For example, the string-compare method requires access to one or more strings of the type descriptors of each of two or more polymorphic entities. As a result, runtime performance of the executable is often degraded because string comparison is slow. As another example, the hash-value compare method can lead to hash collision and thus incorrect processing results (e.g., in the situation where two different type descriptors having different type names hash to the same hash value).

Still further, it is often desirable to "lazily load" shared libraries at run time or, in other words, to delay loading a shared object into the memory space of an executing program until a function or subroutine that resides in the shared object is called or referenced by the executing program. However, references to variables (e.g. information, data) that reside in a shared library would cause the shared library to be loaded into the executing program's memory space immediately at the start of runtime of the executing program. In this regard, the unique type descriptor method can break the lazy loading of shared libraries that include type descriptor definitions as the type descriptors are data. As a result, an entire shared library may be loaded into the execution space of a program even though it may ultimately be unnecessary for the proper functioning of the executable file.

The present invention is directed to methods and systems adapted to avoid the above-discussed problems with current manners of comparing and analyzing the dynamic types of two polymorphic entities at runtime of an executable file. Briefly, the following description provides methods, systems, software, and the like (e.g., utilities) that uniquely define a number of Fortran type descriptors (or types of type descriptors) at a respective number of particular addresses within the memory space of an executing program and/or shared library to allow the dynamic types of two polymorphic entities to be compared with high accuracy by comparing the addresses of the Fortran type descriptors associated with each of the polymorphic entities. More specifically, each type of type descriptor has a single copy appropriately defined in either an executable file or a shared library. Thereafter, and as will be discussed in more detail below, all references (e.g., originating from the executable and/or a shared library) to a particular type of type descriptor definition (e.g. located in the executable and/or the shared library) can be bound to the single copy of the particular type of type descriptor. The above arrangement thus effectively results in only a single (e.g., unique) copy of each type of type descriptor to which all polymorphic entities (and/or all of the polymorphic entities that could possibly assume dynamic types corresponding to such type descriptor types) point or reference. Hence, the dynamic types of two or more polymorphic entities can be compared and/or analyzed with high accuracy by comparing the addresses of the type descriptors associated with each of the polymorphic entities (e.g., once identifiers of the particular type descriptors have been resolved into memory addresses).

Unlike previous manners of comparing the dynamic types of polymorphic entities, two polymorphic entities associated with Fortran type descriptors having different memory addresses necessarily implies (i.e., in the absence of software bugs or other processing errors) that the two polymorphic entities are not of the exact same dynamic type (i.e., due to the presence of only a single copy of each type of type descriptor definition to which all polymorphic entities in the executable and/or shared library(ies) point or reference). Also in contrast to previous manners of comparing the dynamic types of polymorphic entities, the present utilities allow one or more shared libraries (that may or may not include, inter alia, copies of type descriptor definitions) to be lazily loaded at run time of an executable due to polymorphic entities referencing the single copies of the various types of Fortran type descriptor definitions in the executable instead of in the one or more shared libraries.

The present utilities generally achieve the provision of single or unique copies of each of a number of types of Fortran type descriptors to which polymorphic entities can reference. In one arrangement, this is done by instantiating each of a number of types of type descriptors (e.g., during compile-time) in each of a number of object files in which polymorphic entities are defined or referenced, associating common types of type descriptors across the object files with common COMDAT groups (e.g., associating each copy of type descriptor 1 across the object files with COMDAT group 1, and so on), and marking each of the instantiated type descriptors (and in some embodiments type descriptors resident in one or more shared libraries) with a singleton attribute (e.g., STV_SINGLETON). The COMDAT groupings cause a linker to select a single copy among the plurality of copies for each type of type descriptor and to discard the remaining copies while the singleton attribute causes a runtime linker to bind all references to each type of type descriptor (e.g., originating from the executable and/or a shared library) to the single or unique copy of the type of type descriptor, either in the executable file (e.g., as the single copy of each type of type descriptor in the executable would occur at runtime before any duplicate copies resident in shared libraries to which the executable depends) or, if the executable contains no copy of that type of type descriptor, in a shared library.

In one aspect, a computer-implemented method includes generating a plurality of object files from a plurality of source code portions, where at least one of the source code portions contains one or more variables (e.g., polymorphic entities). At compile time, type descriptor definitions of the polymorphic entities are instantiated in (e.g., copied into) each of the object files and each of such type descriptor definitions is marked with a singleton attribute. Additionally, common type descriptor definition copies are associated with common COMDAT groups across the object files.

For instance, a folding operation (e.g., COMDAT folding) of common type descriptor definitions across the plurality of object files may be performed to obtain a single copy of each type of type descriptor definition in an executable file, each of which resides at a particular address in the memory space of the executing program. In some arrangements, the singleton attribute of each of the single copies of the various types of type descriptor definitions may be used to bind, for each type of type descriptor, all references to the type descriptor (e.g., whether originating in the executable and/or in a related shared object or library) to the single copy, whether it is resident in the executable or in a shared library. Thereafter, the address of a type descriptor definition of a first polymorphic entity of the executable file may be compared to an address of a type descriptor definition of a second polymorphic entity of the executable file to determine whether a dynamic type of the first polymorphic entity is the same as the dynamic type of the second polymorphic entity. Instructions can then be executed based on, for instance, whether or not the dynamic type of the first polymorphic entity is the same as the dynamic type of the second polymorphic entity, is an extension of the dynamic type of the second polymorphic entity or another object, and the like.

Any of the embodiments, arrangements, or the like discussed herein may be used (either alone or in combination with other embodiments, arrangement, or the like) with any of the disclosed aspects. Merely introducing a feature in accordance with commonly accepted antecedent basis practice does not limit the corresponding feature to the singular. Any failure to use phrases such as "at least one" does not limit the corresponding feature to the singular. Use of the phrase "at least generally," "at least partially," "substantially" or the like in relation to a particular feature encompasses the corresponding characteristic and insubstantial variations thereof. Furthermore, a reference of a feature in conjunction with the phrase "in one embodiment" does not limit the use of the feature to a single embodiment.

In addition to the exemplary aspects and embodiments described above, further aspects and embodiments will become apparent by reference to the drawings and by study of the following descriptions.

DETAILED DESCRIPTION

Various embodiments herein include utilities that facilitate the comparison of the dynamic types of two or more polymorphic entities or variables at runtime of an executable file for use in taking one or more particular actions at runtime based on whether the dynamic types are the same, are extension types of another polymorphic entity or object, are not the same, and the like. As will be discussed in more detail in the discussion that followings, the utilities disclosed herein make use of singleton attributes and COMDAT groupings in relation to Fortran type descriptors that are instantiated in each of a number of object files and/or shared libraries in which polymorphic entities are located to ensure that the polymorphic entities reference only a single copy of each type of type descriptor in a corresponding executable file or shared library. As all references to a particular type of type descriptor are bound to the single copy of the particular type of type descriptor, address comparisons of type descriptors can provide a highly accurate indication as to whether two or more polymorphic entities are of the same type, extension types of another object, and the like. In contrast to previous manners of such comparisons and analyses, the utilities disclosed herein facilitate such comparisons and analyses in a manner that limits runtime performance impact and the breaking of the lazy loading of shared objects.

Figure 1:
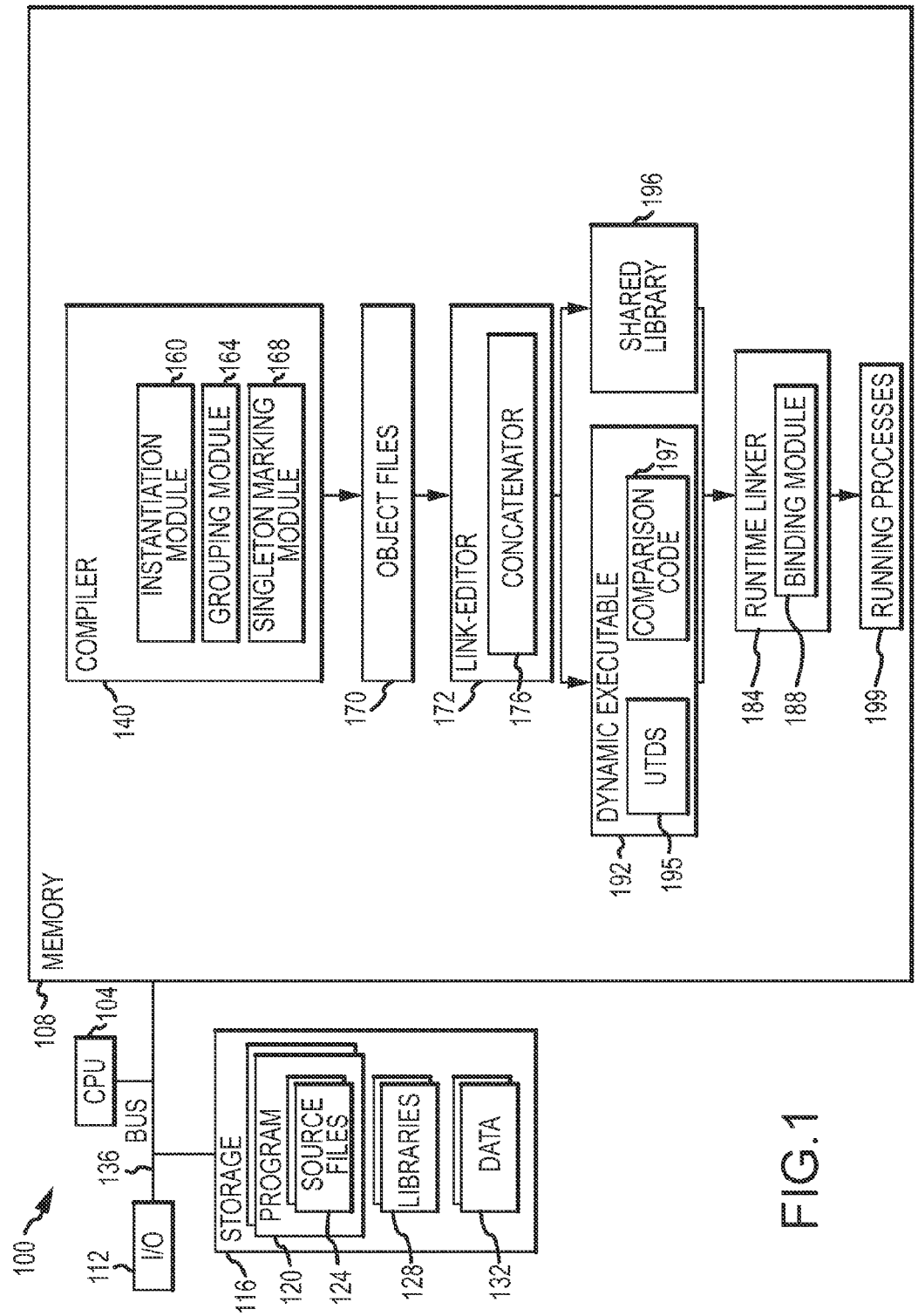
FIG. 1 is a block diagram of a computing system that allows a programmer or other user to build and produce a runnable process that utilizes unique Fortran type descriptor definitions for polymorphic entities while limiting the breakage of the lazy loading of shared objects and/or libraries.

FIG. 1 illustrates a computing system 100 that may be used to uniquely define Fortran type descriptors within an execution environment for use in conducting polymorphic entity dynamic type comparisons while limiting the breakage of shared objects or library lazy loading. The computer or computer system 100 may take a wide variety of forms to practice the invention but generally may include processing unit 104 that runs software or program modules from memory 108 (e.g., RAM) to perform particular functions. In this regard, the computing system 100 may be considered a special-purpose or particular machine adapted for uniquely defining type descriptors of polymorphic entities and other objects. The processor 104 also controls operation of input/output (I/O) devices 112 such as a keyboard, mouse, display such as a touch screen or monitor, and the like that allow a programmer or other user of computing system 100 to generate or at least select and load one or more programs 120 each including a number of source files 124 having zero or more polymorphic entities and then call a compiler 140 located in memory 108 to compile the source files in a manner that allows for the unique definition of each of a number of type descriptors of the polymorphic entity(ies) within the memory space of a subsequently created executable file and/or shared library. The computing system 100 may also include any appropriate (non-volatile) storage arrangement 116 that can store the programs 120, libraries 128, other data 132, and the like before being appropriately loaded into memory 108 for manipulation by processing unit 104. The various components can be interconnected by a system bus 136 in any appropriate manner. While illustrated as a single device or system, the computing system 100 may in some embodiments be spread among a number of devices or components (e.g., in a cloud computing or distributed processing environment).

The compiler 140 is generally operable for transforming the source code or files written in a programming language (the source language, e.g., Fortran) into a computer language (the target language, often having a binary form known as object code) for use in creating one or more executable programs. Stated differently, the compiler 140 is generally responsible for bridging source programs written in high-level languages with the underlying hardware of the computing system 100 (e.g., the processor 104, I/O devices 112, and the like). It will be appreciated that the compiler may generate and/or work with one or more intermediate representations (IRs) as part of source code transformation. An output of the compiler 140 is a number of object files 170.

Before discussing additional aspects of the compiler 140, reference will be made to a first or static linking module or link-editor 172 and a second or dynamic linking module or runtime interpreter/linker 184 that are generally collectively operable to generate one or more dynamic executables 192 and/or shared libraries 196 from a number of object files 170, perform any necessary linking and binding of the dynamic executables and shared libraries 196 and create one or more running or runnable processes 199 as shown in FIG. 1. As shown, the link-editor 172 may include a concatenator 176 that takes one or more of the object files 170 generated by the compiler 140 and combines and interprets the object files 170 to produce or form one or more output files. Part of the work performed by the concatenator 176 may include resolving one or more symbols within the various object files 170 that either refer to or allow reference by other object files 170 (i.e., replacing symbols with runtime memory addresses) and appropriately arranging the object files 170 in an address space allocated to the particular program 120.

Representative output files from the link-editor 172 may include a dynamic executable 192 (e.g., a concatenation of object files 170 that requires intervention by the runtime linker 184 to produce a runnable process due to one or more unbound symbolic references), a shared object or shared library 196 (e.g., a concatenation of object files that provide services such as functions and/or data that might be bound to a dynamic executable at runtime), and/or the like. Some of the object files 170 used by the link-editor 172 to generate dynamic executables 192 and/or shared libraries 196 might already reside in one or more shared libraries 196. Furthermore, more than one link-edit phase may be necessary to generate the particular dynamic executable(s) 192 and/or shared library(ies) 196 required at runtime.

The runtime linker 184 may include a binding module 188 that is generally responsible for analyzing any unbound or unresolved symbolic references within a dynamic executable 192 to determine any required dependencies of the dynamic executable 192 (e.g., one or more shared libraries 196 and/or other object files 170) at runtime. The runtime linker 184 may also perform a final linking or binding of any dependencies that that have changed addresses in memory 108 since the link-edit phase. The runtime linker 184 may perform the binding upon the initialization of execution of the dynamic executable 192 and/or at a later point during execution of the dynamic executable 192 (i.e., it may perform "delayed binding"). As discussed previously, some dependencies such as one or more shared objects 196 may not be actually loaded into the running process 199 until a reference is made to a function that resides in a shared object 196 (i.e., they may be lazily loaded). As discussed previously, various operations exist in Fortran 2003 that allow for customizing the execution of a program based upon a relation of dynamic types between polymorphic entities (e.g., taking a first action at runtime if the dynamic types of first and second polymorphic variables are the same and taking a different second action at runtime if the dynamic types are different). The present disclosure provides utilities that ensure the uniqueness of type descriptors of polymorphic entities (where reference to a particular type descriptor at runtime provides a current dynamic type of a polymorphic entity) by way of defining single, unique copies of each of a number of types of type descriptors in an executable file (e.g., a dynamic executable) or in a shared library and then binding all references to the various types of type descriptors (whether originating in the dynamic executable or in a shared library) to the copies in the dynamic executable (if appropriate copies are available) or to the copies in a shared library. The provision of such unique copies of the type descriptors (each of which resides at a single, defined address in memory) advantageously facilitates the comparison of dynamic types by comparing the referenced addresses of corresponding type descriptors in addition to allowing shared libraries (which may have previously been referenced for type descriptor definitions) to be lazily loaded (e.g., for access to one or more functions that exist in such shared libraries). For instance, as all references to a particular type of type descriptor are bound to the same copy of the particular type of type descriptor, the possibility of incorrect results from the comparison operations (e.g., incorrectly determining that the dynamic types of first and second polymorphic entities are different because they reference different addresses, even though the different addresses correspond to copies of the same type of type descriptor) is eliminated (i.e., in the absence of processing bugs).

With continued reference to FIG. 1, the compiler 140 is generally operable to generate object files 170 having type descriptor definitions each having one or more attributes, associations, and the like. The object files 170 allow for unique copies of each of a number of types of type descriptors to be defined in the dynamic executable 192 or shared library 196 of running process 199 in subsequent steps in the building of the running process 199 (e.g., by link-editor 172, runtime linker 184, and the like). To illustrate the functionality of the compiler 140, reference will also now be made to FIG. 2 (a flow diagram 200 illustrating the generation of objects files and an executable file including unique definitions of each of a number of different types of type descriptors to which all polymorphic entities within the execution environment refer) and FIG. 3 (a method 300 of generating objects files from source code portions with type descriptor definitions, COMDAT groupings, and singleton attributes).

Figure 2:
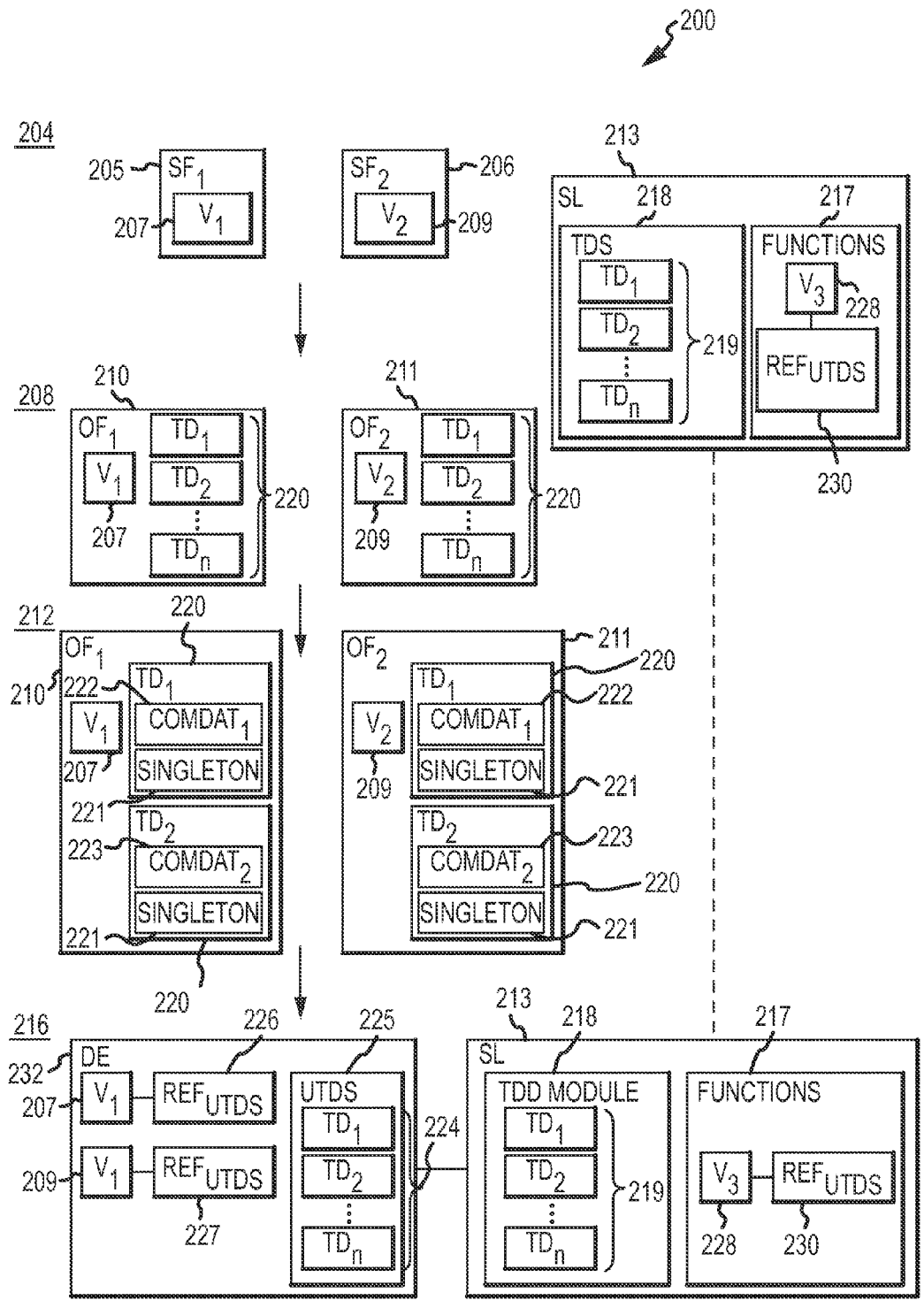
FIG. 2 is a flow diagram that illustrates the generation of an executable file including unique definitions of each of a number of different types of Fortran type descriptors to which all polymorphic entities within the execution environment refer.
Figure 3:
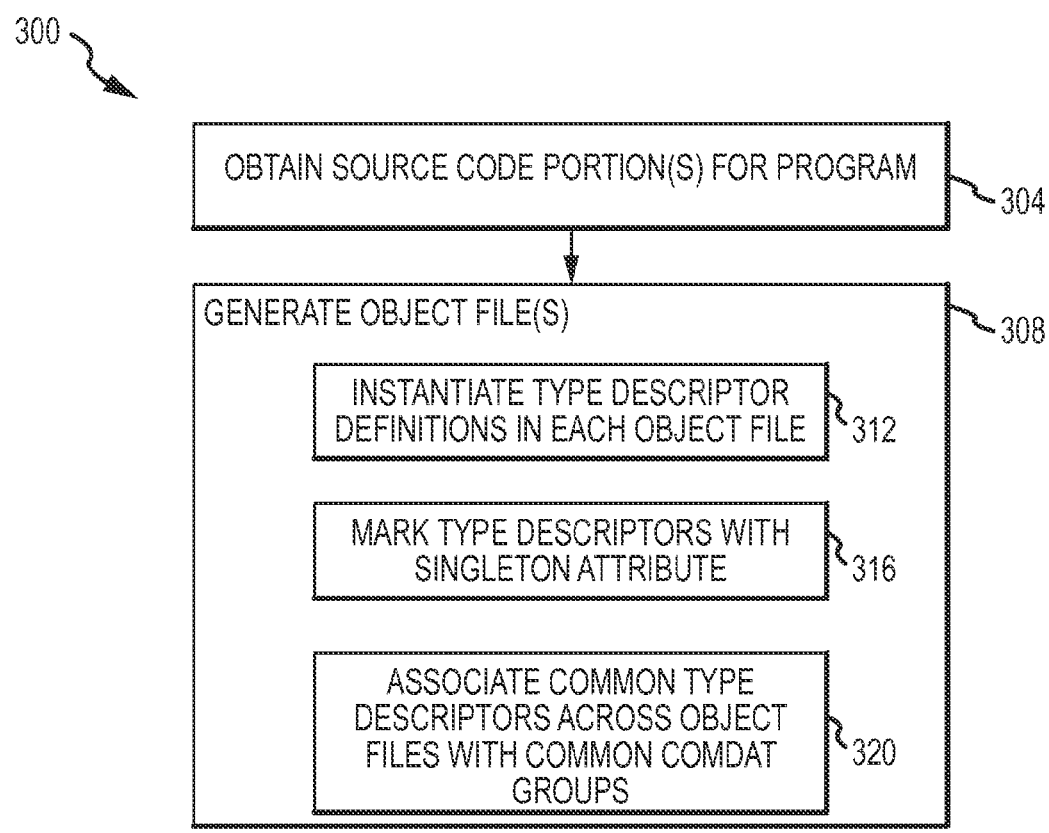
FIG. 3 is a method that may be performed by a compiler of the computing system of FIG. 1 to generate objects files from source code portions with type descriptor definitions, COMDAT groupings, and singleton attributes.

The method 300 of FIG. 3 may obtain 304 source code portions of a particular program in any appropriate manner. For instance, compiler 140 may obtain first and second source files ($SF_1$, $SF_2$) 205, 206 (e.g., source files 124 of FIG. 1) which respectively include first and second variables ($V_1$, $V_2$) 207, 209 (e.g., polymorphic entities) as shown at stage 204 of FIG. 2. The compiler 140 may then appropriately generate 308 first and second object files ($OF_1$, $OF_2$) 210, 211 from $SF_1$ 205, $SF_2$ 206 which include binary or executable code compatible with the various software and hardware portions of the computing system 100 as shown at stages 208, 212 of FIG. 2. While two object files (i.e., $OF_1$ 210, $OF_2$ 211) have been shown as being generated from two source files (i.e., $SF_1$ 205, $SF_2$ 206), fewer or more than two source and object files could be used and generated.

In some arrangements, a shared library (SL) 213 may also be generated that includes one or more functions 217 to which $OF_1$ 210, $OF_2$ 211 and/or subsequently created executables can access and/or utilize. As discussed above, previous and/or current manners of referencing TDs would consist of including a reference in $OF_1$ 210, $OF_2$ 211 to a number of TDs 219 (collectively referred to as TDs 218) in the SL 213 resulting in the previously discussed deficiencies in comparing and analyzing the dynamic types of two or more polymorphic entities.

With continued reference to FIGS. 2 and 3, and in contrast to previous and current manners of referencing TDs for polymorphic entities, one part of the generation 308 of object files may include instantiating 312 copies of TDs (e.g., by instantiating module 160 of compiler 140) in each object file that includes at least one polymorphic entity. As illustrated in stage 212 of FIG. 2, a number of types of type descriptors TDs 220 (e.g., $TD_1$, $TD_2$, and so on up to $TD_n$) may be copied into or otherwise included in each of $OF_1$ 210, $OF_2$ 211. For instance, each of $V_1$ 207, $V_2$ 209 may define a particular class (e.g., "CLASS( )") such that each of $V_1$ 207, $V_2$ 209 can assume any types in the particular class or any of its extensions thereof during execution. While the TDs 220 in $OF_1$ 210, $OF_2$ 211 are shown as being the same, other embodiments envision that the TDs instantiated in $OF_1$ 210 may be at least partially different than those instantiated in OF2 211 (e.g., partial overlap, completely different, and the like). Furthermore, more, fewer or different stages may be included in the flow diagram 200 of FIG. 2 without departing from the spirit of the present disclosure.

Another part of the generation 308 of object files may include marking 316 (e.g., by singleton marking module 168 of compiler 140) each of the instantiated type descriptors with a singleton attribute (e.g., with the "STV_SINGLETON" linker attribute) and grouping or associating 320 (e.g., by grouping module 164) common instantiated type descriptors across the object files with common groups (e.g., with common "COMDAT" groups). Turning now to stage 212 of FIG. 2, each of the instantiated TDs 220 (only $TD_1$ and $TD_2$ have been shown for clarity) has been marked with a singleton attribute 221. Furthermore, each of the instantiated copies of $TD_1$ has been marked or associated with a $COMDAT_1$ grouping 222 while each of the instantiated copies of $TD_2$ has been marked or associated with a $COMDAT_2$ grouping 223. It should be understood that at least some of the various stages (e.g., stage 208, stage 212) as part of the generation of object files may occur at least substantially simultaneously. Thus, the stages 208 and 212 have been shown separately to assist the reader in understanding the various portions of the object files.

Figure 4:
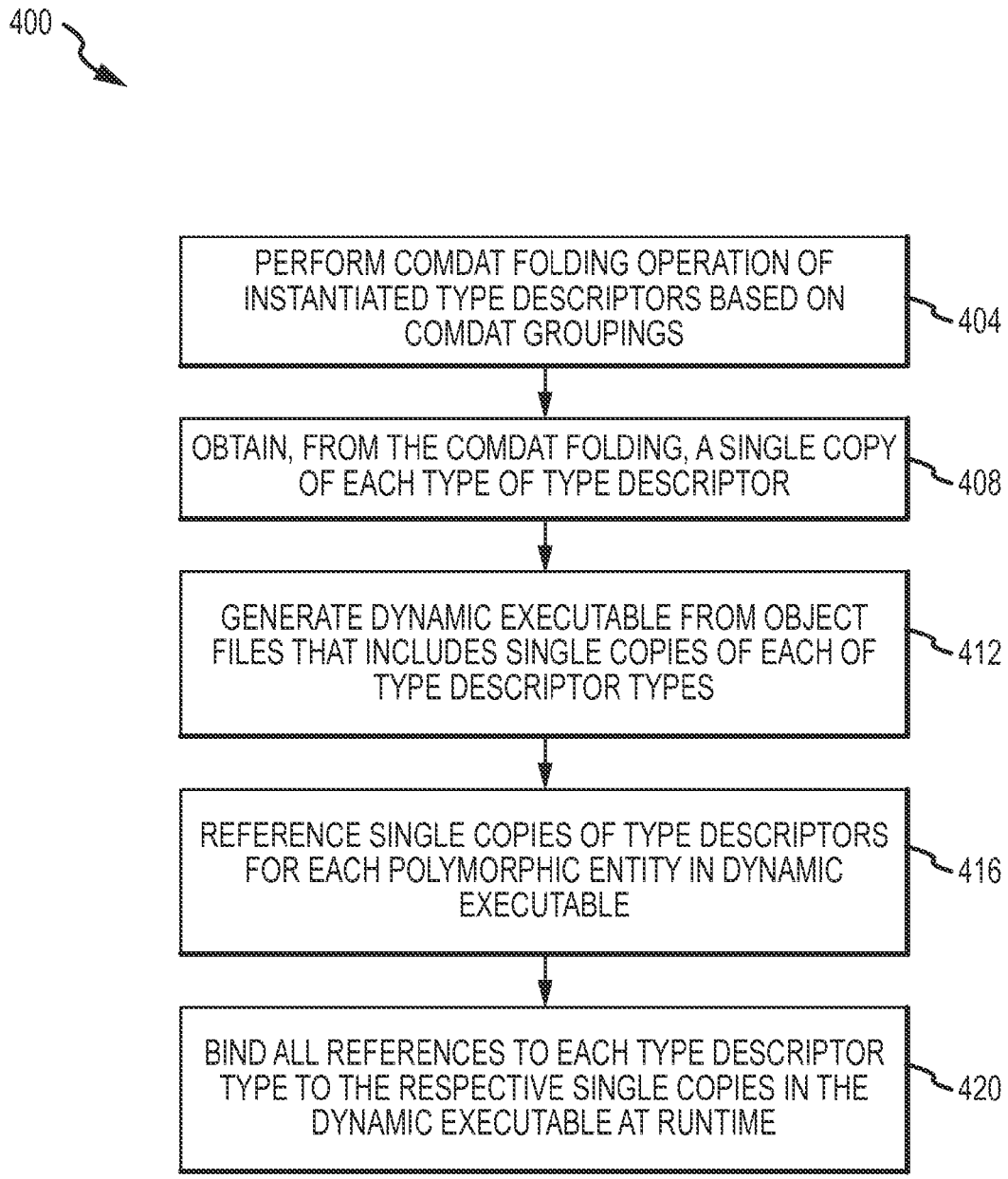
FIG. 4 is a method that may be performed by one or more linkers or linking units that use the object files of FIG. 3 to uniquely define each of a number of types of type descriptors within the address space of an executable file or shared library.

With additional reference now to FIG. 4, a method 400 is disclosed for using the object files generated in the method of FIG. 3 to create an executable that defines unique copies or instances of each of a number of types of type descriptors to which all other references to such type descriptors refer. As discussed previously, such unique copies can ensure the accuracy of dynamic type comparisons between two or more polymorphic entities (e.g., first and second polymorphic entities having first and second references pointing to the same address indicates that the first and second polymorphic entities do in fact have the same dynamic type, first and second polymorphic entities having first and second references pointing to different addresses indicates that the first and second polymorphic entities do not have the same dynamic type (although one may still be an extension of the dynamic type of the other polymorphic entity or object), and the like).

The method 400 may perform 404 (e.g., via concatenator 176) a COMDAT folding operation of the instantiated type descriptors based on the particular COMDAT groupings to obtain 408 a single copy of each type of type descriptor. For instance, and with reference again to stage 212 of FIG. 2, the concatenator 176 may select either TD1 220 associated with $OF_1$ 210 or $TD_1$ 220 associated with $OF_2$ 211 and then discard the non-selected copy of $TD_1$ 220 due to each of the copies of $TD_1$ 220 being associated with the $COMDAT_1$ grouping 222 (a similar process may be performed with TDs 220 associated with other COMDAT groupings, such as for each of the copies of $TD_2$ associated with the $COMDAT_2$ grouping 223).

The method 400 may also generate 412 a dynamic executable or shared library from the object files that includes single/unique copies of each of the various type descriptor types. Turning to stage 216 of FIG. 2, a dynamic executable 232 (e.g., dynamic executable 192 of FIG. 1) is generated (e.g., via link-editor 172 of FIG. 1) from $OF_1$ 210, $OF_2$ 211 that includes V₁ 207, V₂ 209 as well as single/unique copies 224 of each of the various types of type descriptors obtained from the COMDAT folding steps 404, 408. Stated otherwise, the single copies 224 of each of the type descriptor types include those types that could be referenced by polymorphic entities of all of the object files from which the dynamic executable 232 was generated. Of course, if one of the polymorphic entities (e.g., V₁ 207 or V₂ 209) could assume a dynamic type (corresponding to a particular TD) that no other polymorphic entity among the object files could assume, then the method 400 need not necessarily perform a COMDAT folding operation on the particular TD, in which case the copy of the particular TD would simply be the same copy instantiated in the corresponding object file in step 312 of FIG. 3. In any event, each of the single copies 224 of the TDs (e.g., corresponding to TD₁, TD₂, and the like) may reside at a particular address in memory 108 (e.g., which addresses may be consecutive or non-consecutive). The single/unique copies 224 may collectively be referred to as unique type descriptors (UTDs) 225 (e.g., UTDs 195 of dynamic executable 192 of FIG. 1) of the dynamic executable 232.

Returning to FIG. 4, the method 400 may include referencing 416 the single copies of the TDs 224 for each of the polymorphic entities (e.g., V1 207, V2 209) in the dynamic executable 232. For example, and turning back to FIGS. 2, V1 207 and V2 209 may respectively be associated with references (REFUTDs) 226, 227 to the UTDs 225. The references REFUTDs 226, 227 allow each of V1 207, V2 209 to independently assume any of the dynamic types defined by the single/unique TD copies 224 during runtime of the dynamic executable 232. In this example, the polymorphic entities (e.g., V1 207, V2 209) of the dynamic executable 232 only reference the single/unique copies 224 for specifying respective dynamic types of the polymorphic entities (i.e., the polymorphic entities do not reference TDs in other files or shared libraries such as SL 213). Advantageously, the possibility of two polymorphic entities referencing copies of the same TD at different addresses (e.g., at different locations in memory 108) at runtime and the attendant problems (e.g., the processor 104 incorrectly surmising that the two polymorphic entities have different dynamic types due to the different addresses of the referenced TDs) can be avoided.

The method 400 may also include binding 420 all references to each of the various types of type descriptors to the respective single/unique copies of such type descriptor types in the dynamic executable or a shared library at runtime. For instance, the binding module 188 of the runtime linker 184 may perform the binding 420 as a result of the singleton attribute of each of the single copies 224 of the TDs (not shown in stage 216 of FIG. 2). That is, all references (whether originating in the object files or shared library) to the various types of type descriptors may be dynamically replaced with and/or linked to, at runtime (e.g., upon initialization, during runtime, and the like), the particular address in memory 108 of one of the single copies of TDs 224 in the dynamic executable 232 corresponding to a current dynamic type of a polymorphic entity. Advantageously, as none of the polymorphic entities (e.g., V₁ 207, V₂ 209) in dynamic executable 232 makes reference to type descriptors located in shared libraries (e.g., SL 213), such shared libraries can be lazily loaded at runtime for access and utilization of one or more functions or subroutines thereof. Furthermore, the problems associated with one polymorphic entity referencing a type descriptor at one address location and another polymorphic entity referencing the same type descriptor at a different address location can be avoided.

For reference, assume that a programmer opts to lazily load SL 213 (see FIG. 2) in conjunction with the runtime execution of dynamic executable 232. Further assume that at runtime of the dynamic executable 232, one of the functions 217 of SL 213 is called that makes use of V₃ 228 (e.g., a polymorphic entity) and that comparison code 197 of dynamic executable 232 is executed which compares the dynamic type of V₁ 207 to that of V₃ 228. In previous manners of comparing the dynamic types of two polymorphic variables, the processor 104 may surmise that the dynamic types of V₁ 207 and V₃ 228 are different if V₃ 228 had a reference pointing to a definition in TDs 218 of SL 213 while V₁ 207 had a reference pointing to another definition in dynamic executable 232 (each of which would be associated with different addresses in memory 108), even if the dynamic types of V₁ 207 and V₃ 228 were the same (e.g., TD₁).

As shown in FIG. 2 however, V₃ 228 has a reference REF$_{UTDs}$ 230 that is bound to the UTDs 225 in dynamic executable 232 (due to the singleton attributes of the single/unique copies 224 therewithin). As a result, a comparison of the dynamic type of V₁ 207 to that of V₃ 228 by way of comparing addresses of corresponding type descriptors would accurately convey whether the dynamic types are the same (i.e., because, for each type of type descriptor (e.g., TD₁, TD₂, and the like), all polymorphic entities would only make use of the single/unique copies 224 in the executable file 232 or, in the event the single copies 224 reside in the shared library 213, in the shared library 213). While the comparison code 197 is illustrated as residing in the dynamic executable 192 in FIG. 1, other embodiments envision that the comparison code 197 could reside within a shared library (e.g., SL 196) for access by the dynamic executable 192.

Figure 5:
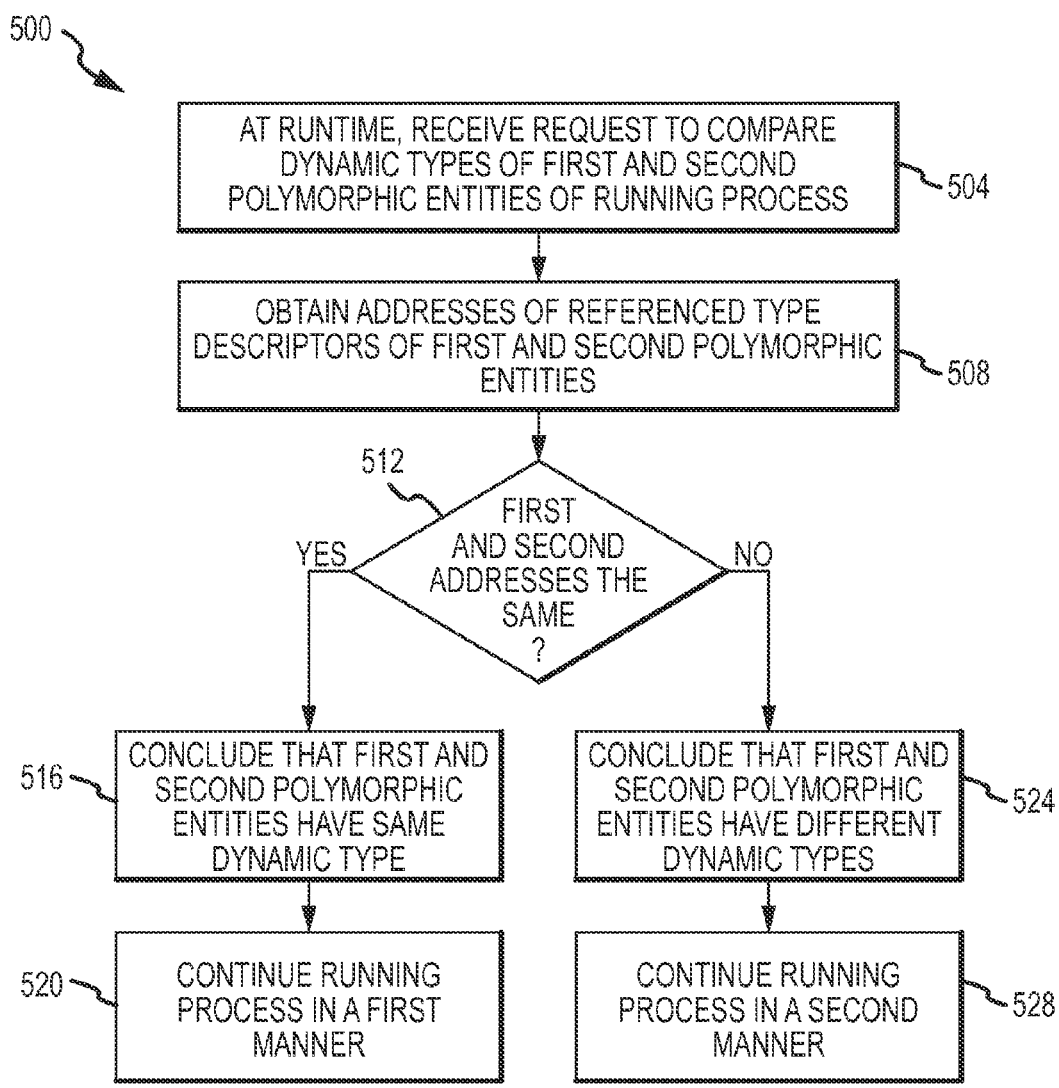
FIG. 5 is a method that may be performed by comparison code of the executable file of FIG. 4 to determine a degree to which the dynamic type of a first polymorphic entity relates to that of a second polymorphic entity

FIG. 5 illustrates a method 500 that may be performed by a running process which makes use of the uniquely defined type descriptors (and their respective unique addresses in memory 108). At 504, a request may be received (or a function called) during runtime of a dynamic executable (e.g., dynamic executable 232, 192) to compare the dynamic types of first and second polymorphic entities (e.g., two of V₁ 207, V₂ 209, V₃ 228). Thereafter, the referenced type descriptor addresses of each of the first and second polymorphic entities may be obtained 508 and compared to determine 512 if the first and second addresses are the same. A positive answer to the inquiry at 512 may lead to a conclusion 516 that the first and second polymorphic entities have the same dynamic type and cause the running process to continue 520 in a first manner while a negative answer to the inquiry at 512 may lead to a conclusion 524 that the first and second polymorphic entities have different dynamic types and cause the running process to continue 528 in a second manner (e.g., by taking making one or more subsequent actions or function calls different than those of the first manner).

It will be readily appreciated that many deviations may be made from the specific embodiments disclosed in the specification without departing from the spirit and scope of the invention. For instance, while this discussion has primarily been in the context of defining unique type description definition copies in a dynamic executable to which all other references refer (e.g., those from the dynamic executable and those from a shared library), this disclosure is not so limited. For instance, in the situation where source code portions to be compiled are devoid of polymorphic variables, the single/unique copies of the type descriptor definitions need not be defined in the dynamic executable. In this case, the unique copies may be defined in an associated shared library (e.g., to which polymorphic variables in the shared library refer). Also, it should be understood that the functionalities performed by many of the processes and modules discussed herein may be performed by other modules, devices, processes, and the like. The illustrations and discussion herein has only been provided to assist the reader in understanding the various aspects of the present disclosure. Furthermore, one or more various combinations of the above discussed arrangements and embodiments are also envisioned (e.g., the methods 300, 400, 500 of FIGS. 3-5 may be used in conjunction).

Embodiments disclosed herein can be implemented as one or more computer program products, i.e., one or more modules of computer program instructions encoded on a computer-readable medium for execution by, or to control the operation of, data processing apparatus. For example, the various components (e.g., modules, markers, and the like) of the compiler 140, link-editor 172 and runtime linker 184 may be provided in such computer-readable medium and executed by a processor or the like. The computer-readable medium can be a machine-readable storage device, a machine-readable storage substrate, a memory device, a composition of matter affecting a machine-readable propagated signal, or a combination of one or more of them. The computing system 100 may encompasses one or more apparatuses, devices, and machines for processing data, including by way of example a programmable processor, a computer, or multiple processors or computers. In addition to hardware, the computing system 100 may include code that creates an execution environment for the computer program in question, e.g., code that constitutes processor firmware, a protocol stack, a database management system, an operating system, or a combination of one or more of them.

A computer program (also known as a program, software, software application, script, or code) used to provide any of the functionalities described herein (e.g., instantiating type descriptor copies in object files, performing COMDAT folding, and the like) can be written in any appropriate form of programming language including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program may include, by way of example, both general and special purpose microprocessors, and any one or more processors of any kind of digital computer. Generally, a processor will receive instructions and data from a read-only memory or a random access memory or both. Generally, the elements of a computer are one or more processors (e.g., processor 104 of FIG. 1) for performing instructions and one or more memory devices (e.g., memory 108) for storing instructions and data. The techniques described herein may be implemented by a computer system configured to provide the functionality described.

In different embodiments, the computing system may include one or more of various types of devices, including, but not limited to a personal computer system, desktop computer, laptop, notebook, or netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or, in general, any type of computing or electronic device.

Typically, a computer will also include, or be operatively coupled to receive data from or transfer data to, or both, one or more mass storage devices for storing data, e.g., magnetic, magneto-optical disks, or optical disks (e.g., storage 116 of FIG. 1). However, a computer need not have such devices. Moreover, a computer can be embedded in another device, e.g., a mobile telephone, a personal digital assistant (PDA), a mobile audio player, a Global Positioning System (GPS) receiver, a digital camera, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry. To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described embodiments including the preferred embodiment and the best mode of the invention known to the inventor at the time of filing are given by illustrative examples only.

We claim:

1. A computer-implemented method, comprising:

generating a plurality of object files from a plurality of source code portions, wherein at least one of the source code portions comprises at least one variable, and wherein the generating comprises:

instantiating Fortran type descriptor definitions of the at least one variable in each of the object files;

marking each type descriptor definition with a singleton attribute; and associating common type descriptor definitions across the object files with common COMDAT groups;

performing a folding operation of the type descriptor definitions in common COMDAT groups across the plurality of object files to obtain a single copy of each type of type descriptor definition in an executable file, wherein each of the single copies resides at a particular address in memory; and for each type of type descriptor definition, using the singleton attribute of the single copy to bind all references to the type to the single copy.

2. The computer-implemented method of claim 1, further comprising:
   comparing an address of a type descriptor definition of a first variable of the executable file to an address of a type descriptor definition of a second variable of the executable file to determine whether a dynamic type of the first variable is the same as the dynamic type of the second variable; and
   executing the executable file based at least in part on whether or not the dynamic type of the first variable is the same as the dynamic type of the second variable.

3. The computer-implemented method of claim 2, further comprising:
   determining that the dynamic type of the first variable is the same as the dynamic type of the second variable responsive to each of the addresses of the type descriptor definitions of the first and second variables comprising the same particular address in memory of one of the single copies of one of the type descriptor definitions; and
   determining that the dynamic type of the first variable is different than the dynamic type of the second variable responsive to the address of the type descriptor definition of the first variable being different than the address of the type descriptor definition of the second variable.

4. The computer-implemented method of claim 2, wherein, for each type of type descriptor definition, at least some of the references that are bound to the single copy of the type descriptor definition were previously directed to a type descriptor definition resident in a shared library.

5. The computer-implemented method of claim 4, further comprising:
   lazily loading the shared library during run-time of the executable file.

6. A computer-implemented method, comprising:
   providing a program comprising at least two source code portions that respectively define first and second polymorphic entities;
   providing a shared library that comprises a plurality of Fortran type descriptor definitions for the polymorphic entities;
   generating, from the at least two source code portions, at least two object files, wherein each object file comprises a copy of each of the type descriptor definitions;
   selecting a copy of a first type of type desciptor definition from one of the at least two object files;
   replacing the first type descriptor definition copy of the other of the at least two object files with at least one reference to the selected first type descriptor definition copy;
   creating an executable file from the at least two object files, wherein the executable file comprises the selected first type descriptor definition copy at a first address in memory and at least one reference to the selected first type descriptor definition copy; and
   binding all references to the first type descriptor definition to the selected first type description definition copy in the executable file.

7. The computer-implemented method of claim 6, further comprising:
   lazily loading the shared library during run-time of the executable file.

8. The computer-implemented method of claim 7, wherein at least one of the references bound to the selected first type descriptor definition copy in the executable file originated from the shared library.

9. The computer-implemented method of claim 7, wherein the executable file comprises the first and second polymorphic entities, and wherein the method further comprises:
   comparing, during run-time of the executable file, a dynamic type of the first polymorphic entity to a dynamic type of the second polymorphic entity.

10. The computer-implemented method of claim 9, wherein the comparing comprises:
    determining an address in memory of a type descriptor definition for each of the first and second polymorphic entities; and
    comparing the addresses of the type descriptor definitions for each of the first and second polymorphic entities.

11. The computer-implemented method of claim 6, wherein the generating comprises:
    associating common type descriptor definition copies in the at least two object files with common COMDAT groups, and wherein the selecting comprises:
    performing COMDAT folding within each COMDAT group.

12. The computer-implemented method of claim 7, wherein the generating comprises:
    marking each type descriptor definition copy in the at least two object files with a singleton attribute, wherein the binding proceeds according to the singleton attribute of the selected type description definition copy in the executable file.

13. A computing system, comprising:
    a processor; and
    a memory unit interconnected to the processor, wherein the memory unit comprises:
      a compiler that is executable by the processor to generate object files from source code portions, wherein each of the object files comprises a plurality of Fortran type descriptor definition copies, and wherein each type descriptor definition copy is associated with a COMDAT group and a singleton attribute;
      a static linker that uses the COMDAT group to select a single defined copy of a first type descriptor from a plurality of defined copies of the first type descriptor among the object files, discard the remaining defined copies of the first type descriptor from the object files, and point each of the polymorphic entities associated with discarded defined copies of the first type descriptor to the single defined copy of the first type descriptor in an executable file; and
      a runtime linker that uses singleton attribute to hind any references to first type descriptor definitions to the single defined copy of the first type descriptor in the executable file.

14. The computing system of claim 13, further comprising:
    a shared library including a reference to the single defined copy of the first type descriptor definition in the executable file, wherein the shared library is lazily loaded at run-time of the executable file.

15. The computing system of claim 13, further comprising:
    a comparison unit that determines, at run-time, whether a dynamic type of a first polymorphic entity of the executable file is the same as a dynamic type of a second polymorphic entity of the executable file.

16. The computing system of claim 15, wherein the comparison unit concludes that the dynamic types of the first and second polymorphic entities are the same responsive to an address of a type descriptor of the first polymorphic entity being the same as an address of a type descriptor of the second polymorphic entity, wherein each of the addresses of the type descriptors of the first and second polymorphic entities comprises an address in memory of the single defined copy of the first type descriptor.

* * * * *